US006608769B2

(12) United States Patent
Bergk

(10) Patent No.: US 6,608,769 B2
(45) Date of Patent: Aug. 19, 2003

(54) SWITCHED MODE POWER SUPPLY WITH A DEVICE FOR LIMITING THE OUTPUT VOLTAGE

(75) Inventor: Günther Bergk, Niedernhausen (DE)

(73) Assignee: Braun GmbH (DE)

( * ) Notice: Subject to any disclaimer, the term of this patent is extended or adjusted under 35 U.S.C. 154(b) by 0 days.

(21) Appl. No.: 10/080,232

(22) Filed: Feb. 21, 2002

(65) Prior Publication Data

US 2002/0080626 A1 Jun. 27, 2002

Related U.S. Application Data

(63) Continuation of application No. PCT/EP00/08241, filed on Aug. 24, 2000.

(30) Foreign Application Priority Data

Aug. 31, 1999 (DE) .......................................... 199 41 449

(51) Int. Cl.[7] .............................................. H02M 3/335
(52) U.S. Cl. ............................... 363/21.12; 363/21.17; 363/21.13
(58) Field of Search ........................... 363/21.12, 21.17, 363/21.13

(56) References Cited

U.S. PATENT DOCUMENTS 5,363,287 A     11/1994   Liu et al. ..................... 363/20
5,521,807 A  *  5/1996    Chen et al. .................. 363/131
5,552,695 A  *  9/1996    Schwartz ..................... 323/271
5,729,448 A  *  3/1998    Haynie et al. .............. 363/21.13

FOREIGN PATENT DOCUMENTS

| DE | 3438251   | 4/1986  | .......... H02M/3/335 |
| DE | 3618221   | 11/1987 | .......... H02M/3/28  |
| DE | 8809723   | 1/1989  | .......... H02P/7/292 |
| DE | 3732334   | 9/1989  | .......... H02H/7/12  |
| DE | 4310513   | 6/1994  | .......... H02M/3/335 |
| DE | 4438388   | 5/1996  | .......... H02M/3/335 |
| EP | 0 255 067 | 2/1988  | .......... H03K/17/08 |
| EP | 0 690 555 | 1/1996  | .......... H02M/3/338 |
| JP | 63-77376  | 4/1988  | .......... H02M/3/28  |
| JP | 5-130730  | 5/1993  | .......... H02H/7/12  |
| WO | 94/06177  | 3/1994  | .......... H01R/13/66 |
| WO | 95/12840  | 5/1995  | .......... G05F/1/56  |

* cited by examiner

Primary Examiner—Bao Q. Vu
(74) Attorney, Agent, or Firm—Fish & Richardson PC

(57) ABSTRACT

The invention is directed to a switched mode power supply, in particular a flyback converter, with a device for limiting the output voltage. To provide a safeguard against excessive output voltages, a Schottky diode is connected in reverse direction between the output terminals of a switched mode power supply of the invention.

28 Claims, 1 Drawing Sheet

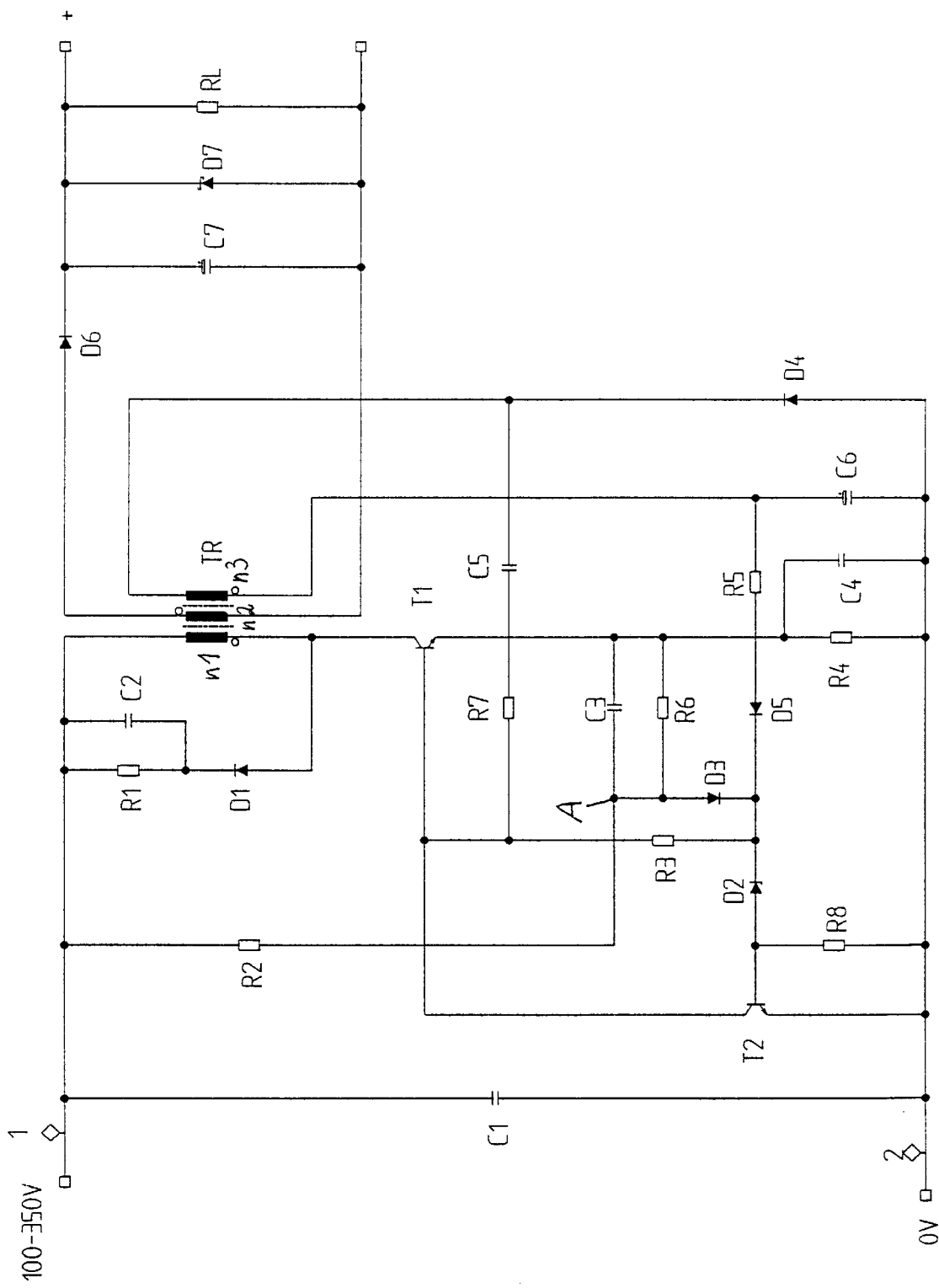

SWITCHED MODE POWER SUPPLY WITH A DEVICE FOR LIMITING THE OUTPUT VOLTAGE

This is a continuation of International Patent Application PCT/EP 00/08241, filed Aug. 24, 2000, which claims priority from German Application DE 199 41 449.1 filed Aug. 31, 1999.

This invention relates to a switched-mode power supply, in particular a flyback converter, with a device for limiting the output voltage.

Flyback converters possess the property of supplying constant electrical power at their output. Therefore, the output voltage of a flyback converter is governed by the resistance level of a load resistor connected to the output. In the absence of a load resistor connected to the output, the output voltage may assume very high values. From WO 94/06177 a flyback converter is known which is built in a plug-in power supply and contains a regulator for monitoring the output voltage. Two control voltages influence the performance of this flyback converter, whereof the first voltage is proportional to the primary current. By means of an auxiliary winding of a transformer two voltages are obtained of which the one is proportional to the output voltage and the other proportional to the input voltage. From these two voltages the second control voltage is derived. The regulator is provided on the secondary side of the transformer and delivers, in the presence of too high an output voltage, via an optical coupler a signal that acts upon the second control voltage. This flyback converter is a correspondingly elaborate and expensive device.

To protect against excessive voltages at the output of a switched mode power supply, a zener diode is typically used which is connected between the output terminals of the switched mode power supply. However, when the output voltage rises severely due to a malfunction of the switched mode power supply, zener diodes may heat to a temperature causing their solder joints to melt, with the consequence that the output voltage may then assume nearly any high value. Zener diodes hence are no guarantee for the output voltage to be reliably maintained below a specific permissible maximum voltage level.

It is an object of the present invention to provide a switched mode power supply comprising a simple device for limiting the output voltage.

In a switched mode power supply of the invention, a Schottky diode is connected in reverse direction between the output terminals to provide a safeguard against excessive output voltages. When the output voltage exceeds the reverse voltage of the Schottky diode, its semiconductor structure will be irreversibly destroyed within a few milliseconds, whereupon it has a very low resistance in both current directions, thus permanently short-circuiting the output of the switched mode power supply without being thermally overloaded. When the nominal output voltage of the switched mode power supply is 12 volts, for example, a Schottky diode with a breakdown voltage of between about 25 and 30 volts can be used to make sure that in the event of a defect in the switched mode power supply its output voltage does not at any time, not even temporarily, exceed 40 volts, for example. The use of a Schottky diode connected in reverse direction between the output terminals of a switched mode power supply hence ensures that the output voltage is reliably maintained below a specific maximum voltage level.

A preferred embodiment of a switched mode power supply of the invention includes a first controllable switching device arranged in series with the primary winding of a transformer and a current measuring resistor. The control state of a second controllable switching device which drives a control input of the first controllable switching device is determined by the sum of three control voltages, of which the first is proportional to the current flowing through the current measuring resistor, the second is proportional to the input voltage, and the third is proportional to the output voltage. The second control voltage can be generated by a primary voltage divider. The third control voltage can be generated by means of an auxiliary winding of the transformer.

In the switched mode power supply of the present invention the third control voltage is also conveyed to the control input of the first controllable switching device. This has the advantage that at the end of the open state of the first controllable switching device the voltage residing at its control input is of a magnitude sufficiently high to effect rapid closing of the first controllable switching device.

An embodiment of the present invention will be explained in more detail in the following with reference to a flyback converter of the invention illustrated in the accompanying drawing. A further embodiment is described in the description.

The flyback converter of the invention presented in the FIGURE comprises a transformer TR having its primary winding n1 connected in series with the collector-emitter path of a first transistor T1 and a current measuring resistor R4 having a fourth capacitor C4 connected in parallel therewith. This series arrangement is connected to input terminals 1, 2 adapted to supply to the flyback converter a dc voltage, in particular a rectified line voltage of between 100 and 350 volts, for example. Connected across the input terminals 1, 2 is also a first capacitor C1. Moreover, a voltage divider comprised of a second resistor R2, a sixth resistor R6 and the current measuring resistor R4 is connected across the input terminals 1, 2. Connected in parallel with the sixth resistor R6 is a third capacitor C3. The junction A of the second and the sixth resistor is connected to the anode of a third diode D3. The base of the first transistor T1 is connected to the collector of a second transistor T2 and, via a third resistor R3, to the cathodes of the third diode D3, a fifth diode D5, and a zener diode D2. The zener diode D2 has its anode coupled to the base of the second transistor T2 and, via an eighth resistor R8, to ground, that is, to the input terminal 2. The emitter of the second transistor T2 is connected to ground. The fifth diode D5 has its anode connected, via a fifth resistor R5, to the positive pole of a sixth capacitor C6 and to the one end of an auxiliary winding n3 of the transformer TR. The auxiliary winding n3 has its other end connected to the cathode of a fourth diode D4 and, via a series arrangement comprised of a fifth capacitor C5 and a seventh resistor R7, to the base of the first transistor T1. The fourth diode D4 has its anode connected to the negative pole of the sixth capacitor C6 and to ground. The first transistor T1 has its collector coupled to the one end of the primary winding n1 of the transformer TR and to the anode of a first diode. The input terminal 1 is connected to the other end of the primary winding n1 of the transformer TR and, via a first resistor R1, to the cathode of the first diode D1. In parallel arrangement with the first resistor R1 is a second capacitor C2. The secondary winding n2 of the transformer TR has its one end connected to the negative pole of a seventh capacitor C7, to the anode of a Schottky diode D7, and to the one output terminal of the flyback converter. The secondary winding n2 of the transformer TR has its other end connected to the anode of a sixth diode D6 having its cathode connected to the other output terminal of the flyback converter, to the positive pole of the seventh capacitor C7, and to the cathode of the Schottky diode D7. A load resistor RL is connected across the output terminals.

While the Schottky diode D7 connected across the output terminals in the reverse direction serves as a safeguard against excessive output voltages in the event of a malfunction or a defect in the switched mode power supply, it will be appreciated, of course, that it is also suitable for this use in switched mode power supplies other than the one shown in the FIGURE.

The mode of operation of the flyback converter of the invention shown in the FIGURE will be described in the following. The dc voltage present across the input terminals 1, 2 passes via the second resistor R2, the third diode D3 and the third resistor R3 to the base of the first transistor T1. The collector current hence flowing through the primary winding n1 of the transformer TR induces in the auxiliary winding n3 of the transformer TR a voltage driving, via the fifth capacitor C5 and the seventh resistor R7, the base of the first transistor T1 additionally which then becomes rapidly conducting until saturation.

The current flowing through the primary winding n1 of the transformer TR, the collector-emitter path of the first transistor T1 and the current measuring resistor R4 produces across the latter a first control voltage proportional to the current. A voltage divider comprised of the second resistor R2, the sixth resistor R6 and the current measuring resistor R4 produces across the sixth resistor R6 a second control voltage proportional to the input voltage, so that at node A a voltage prevails which corresponds to the sum of the first and second control voltage. The voltage at node A is conveyed to the cathode of the zener diode D2 via the third diode D3. When the voltage at the cathode of the zener diode D2 exceeds a threshold value determined by the reverse voltage of the zener diode D2 and the base-emitter voltage of the second transistor T2, the second transistor T2 is driven which then connects, via its collector-emitter path, the base of the first transistor T1 to ground, causing the first transistor T1 to be off. The energy stored in the transformer TR is then supplied by the secondary winding n2 via the sixth diode D6 to the seventh capacitor C7 and the load resistor RL. In addition, via the auxiliary winding n3 the sixth capacitor C6 is charged to a voltage proportional to the output voltage. The voltage spikes occurring at the collector of the first transistor T1 as it is turned off are limited by the first diode D1, the first resistor R1, and the second capacitor C2.

The voltage across the sixth capacitor C6 which is proportional to the output voltage is conveyed to the cathode of the zener diode D2 via the fifth resistor R5 and the fifth diode D5. When the output voltage increases due to an only minor load of the output, so does the voltage across the sixth capacitor C6, and the voltage threshold value necessary for driving the second transistor T2 is reached more rapidly in the subsequent conducting period of the first transistor T1, that is, already in the presence of a lower current through the current measuring resistor R4 than in the presence of a lower output voltage. In consequence, the duration of the conducting period of the first transistor T1 is shortened, which counteracts the rise in output voltage. Also in the presence of a higher input voltage the voltage threshold value is reached more rapidly than in the presence of a lower input voltage, that is, the duration of the conducting period of the first transistor T1 becomes shorter when the input voltage increases. Therefore, the duration of the conducting period of the first transistor T1 is determined by the sum of three control voltages: the first control voltage which is proportional to the current through the current measuring resistor R4, the second control voltage which is proportional to the input voltage, and a third control voltage which is proportional to the output voltage of the switched mode power supply. The third diode D3 serves a decoupling function between the third control voltage and the sum of the first and second control voltage prevailing at node A. The third control voltage is conveyed, via the third resistor R3, also to the base of the first transistor T1, causing it to turn on rapidly again at the end of its non-conducting period.

What is claimed is:

1. A switched mode power supply comprising:
   a flyback converter comprising
      a first input line and a second input line, both of which are connected to input voltage source during use;
      output terminals to supply an output voltage;
      a capacitor connected between the output terminals;
      a Schottky diode connected in reverse direction between the output terminals in parallel with the capacitor to prevent output voltage from increasing above a threshold value;
      a transformer having a primary winding;
      a first controllable switching device having a control input and having a main current path;
      a current measuring resistor, wherein the primary winding, the main current path of the first controllable switching device and the current measuring resistor form a series arrangement having one end connected to the first input line and a second end connected to the second input line; and
      a second controllable switching device having a control input and having a main current path that connects the control input of the first controllable switching device to one of the first and second input lines, wherein the second controllable switching device has a conductivity that depends on a voltage residing at its control input, which voltage is influenced by first, second, and third control voltages, and wherein the first control voltage increases in response to an increase in the current flowing through the current measuring resistor, the second control voltage is producible from the input voltage by a primary voltage divider and increases in response to an increase in the input voltage, and the third control voltage increases in response to an increase in the output voltage.

2. The switched mode power supply according to claim 1, wherein the sum of the first, second, and third control voltages is adapted to be conveyed to the control input of the second controllable switching device.

3. The switched mode power supply according to claim 1 or 2, wherein the third control voltage is also adapted to be conveyed to the control input of the first controllable switching device.

4. The switched mode power supply of claim 1 wherein the control input of the first controllable switching device controls the amount of current flowing through the main current path and is responsive to the amount of current flowing through the primary winding.

5. The switched mode power supply of claim 4 wherein the first input terminal and the second input terminal provide the current to the primary winding.

6. The switched mode power supply of claim 5 wherein the control input of the first controllable switching device is also responsive to a voltage level between the first and second input lines.

7. The switched mode power supply of claim 6 wherein the control input of the first controllable switching device is also responsive to an output voltage level at the output terminals.

8. A switched mode power supply, comprising:
- a power supply section having output terminals and a capacitor connected between the output terminals;
- a Schottky diode connected in reverse direction between the output terminals in parallel with the capacitor to prevent output voltage from increasing above a threshold value;
- a transformer having a primary winding;
- a first input terminal and a second input terminal to provide the current to the primary winding;
- a first controllable switching device having a control input and a main current path that is connected in series with the primary winding; and
- a second controllable switching device having a control input and a main current path that connects the control input of the first controllable switching device to one of the first and second input terminals, the second controllable switching device having a conductivity that depends on a voltage residing at its control input;
- wherein the voltage at the control input of the second controllable switching device is influenced by first, second, and third control voltages, and wherein the first control voltage increases in response to an increase in the current flowing through primary winding, the second control voltage increases in response to an increase in a voltage level between the first and second input lines, and the third control voltage increases in response to an increase in an output voltage at the output terminals.

9. The switched mode power supply according to claim 8, the sum of the first, second, and third control voltages is adapted to be conveyed to the control input of the second controllable switching device.

10. The switched mode power supply according to claim 9, wherein the third control voltage is also adapted to be conveyed to the control input of the first controllable switching device.

11. The switched mode power supply according to claim 8, wherein the third control voltage is also adapted to be conveyed to the control input of the first controllable switching device.

12. The switched mode power supply according to claim 8, wherein the power supply section is adapted to produce an electrical power at a substantially constant power level.

13. The switched mode power supply according to claim 8, wherein the Schottky diode prevents the output voltage from increasing above the threshold value when current flowing from the power supply section between the output terminals is below a corresponding value.

14. A switched mode power supply comprising:
- a first input line and a second input line, both of which are connected to an input voltage source during use;
- output terminals to supply an output voltage;
- a Schottky diode connected in reverse direction between the output terminals;
- a transformer having a primary winding;
- a first controllable switching device having a control input and having a main current path;
- a current measuring resistor, wherein the primary winding, the main current path of the first controllable switching device and the current measuring resistor form a series arrangement having one end connected to the first input line and a second end connected to the second input line; and
- a second controllable switching device having a control input and having a main current path that connects the control input of the first controllable switching device to one of the first and second input lines, wherein the second controllable switching device has a conductivity that depends on a voltage residing at its control input, which voltage is influenced by a first, second, and third control voltage, and wherein the first control voltage increases in response to an increase in the current flowing through the current measuring resistor, the second control voltage is producible from the input voltage by a primary voltage divider and increases in response to an increase in the input voltage, and the third control voltage increases in response to an increase in the output voltage.

15. The switched mode power supply according to claim 14, wherein the sum of the first, second, and third control voltages is adapted to be conveyed to the control input of the second controllable switching device.

16. The switched mode power supply according to claim 15, wherein the third control voltage is also adapted to be conveyed to the control input of the first controllable switching device.

17. The switched mode power supply according to claim 14, wherein the third control voltage is also adapted to be conveyed to the control input of the first controllable switching device.

18. The switched mode power supply of claim 8, wherein the output terminals are connected directly to a load without any filters between the load and the output terminals.

19. The switched mode power supply of claim 18, wherein the power supply section comprises a secondary winding to provide an output voltage between the output terminals.

20. The switched mode power supply of claim 19, wherein the voltage at the control input of the second controllable switching device is influenced by a control voltage that is proportional to the current flowing through the primary winding of the transformer.

21. The switched mode power supply of claim 19, wherein the voltage at the control input of the second controllable switching device is influenced by a control voltage that is proportional to a voltage between the first and second input terminals.

22. The switched mode power supply of claim 19, wherein the voltage at the control input of the second controllable switching device is influenced by a control voltage that is proportional to the output voltage.

23. The switched mode power supply according to claim 8, wherein the sum of the first, second, and third control voltages is adapted to be conveyed to the control input of the second controllable switching device.

24. The switched mode power supply according to claim 8, wherein the third control voltage is also adapted to be conveyed to the control input of the first controllable switching device.

25. The switched mode power supply of claim 8 wherein the control input of the first controllable switching device controls the amount of current flowing through the main current path and is responsive to the amount of current flowing through the primary winding.

26. The switched mode power supply of claim 25 wherein the first input terminal and the second input terminal provide the current to the primary winding.

27. The switched mode power supply of claim 26 wherein the control input of the first controllable switching device is also responsive to a voltage level between the first and second input lines.

28. The switched mode power supply of claim 27 wherein the control input of the first controllable switching device is also responsive to an output voltage level at the output terminals.

* * * * *